Aug. 7, 1956 R. W. BINGHAM 2,757,945
SEALED PIPE JOINT AND METHOD OF MAKING THE SAME
Filed March 7, 1956
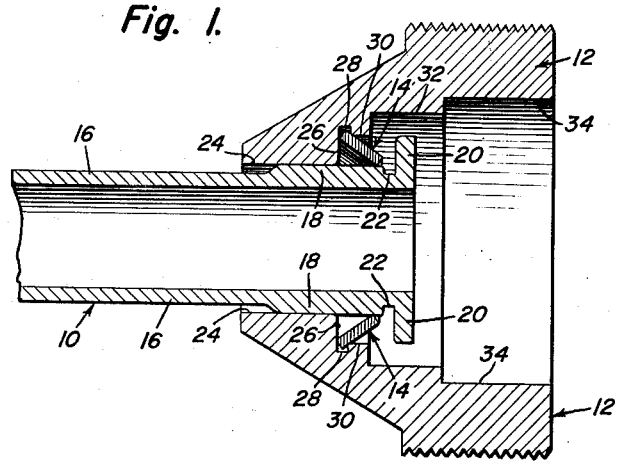
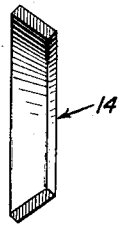
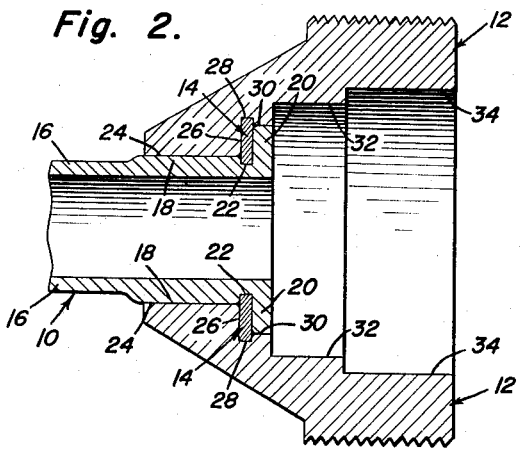
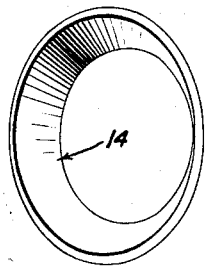
INVENTOR.
Robert W. Bingham
BY
ATTORNEY.

United States Patent Office 2,757,945
Patented Aug. 7, 1956

2,757,945

SEALED PIPE JOINT AND METHOD OF MAKING THE SAME

Robert W. Bingham, Frederick, Md.

Application March 7, 1956, Serial No. 570,188

9 Claims. (Cl. 285—340)

(Granted under Title 35, U. S. Code (1952), sec. 266)

The invention described herein may be manufactured and used by or for the Government of the United States of America for governmental purposes without the payment to me of any royalty thereon.

This application is a continuation-in-part of my application Serial No. 359,674, filed June 4, 1953, now abandoned.

This invention relates to a sealing device and particularly to one for use in connection with pipe joints and the like.

It is an object of this invention to provide a fluid-tight pipe joint wherein the joint is both sealed and locked by the same means.

It is another object of this invention to provide a fluid-tight pipe joint wherein sealing and locking of the joint is effected by the same means, and wherein said sealing and locking means are seated in the single step of assembling the two major parts of the pipe joint.

It is still another object of this invention to provide a fluid-tight pipe joint wherein the joint consists of just three elements.

The sealing art has long been plagued by the problem of rendering pipe joints fluid-tight in situations where it is necessary or desirable to utilize an all-metal structure. This problem is particularly acute in those activities wherein fluids are involved which are dangerous if they escape, such as the highly toxic agents used in agent filled munitions. However, this problem is not limited to this restricted field for it is generally recognized in the sealing art. One attempted solution advanced by the art, and particularly in the restricted field of agent filled munitions, has been to effect a pressfit between the two major parts of the pipe joint. Slight tapering or the presence of longitudinal scratches on either of the parts is lightly to result in leakage. Therefore it has been necessary, in order to adequately seal pressfit pipe joints, that the parts be microfinished with extreme accuracy. The shortcoming of this approach is that it is difficult to maintain on microfinished parts the close dimensional tolerances needed for a pressfit. As a result of these factors, the pressfit pipe joint is likely to result in a high incidence of leakers, and therefore has not been accepted by the art as the solution to this problem.

Another proposed solution to the problem has been to utilize a pressfit pipe joint in conjunction with a ring of solder between the parts. This arrangement is deficient for many reasons, among which is the deleterious effects on the pipe joint of the heat employed in soldering the ring, such as buckling, the creation of stresses or relieving of the pressfit.

The above and other objects will become apparent from the following description of the invention taken in conjunction with the drawings wherein: Fig. 1 is a longitudinal, sectional view through the parts of the pipe joint immediately prior to their being assembled. Fig. 2 is a longitudinal, sectional view of the pipe joint, after the parts are fully assembled. Fig. 3 is a longitudinal, sectional view of the locking and sealing washer. Fig. 4 is a perspective view of the locking and sealing washer.

Referring to the drawings and particularly to Fig. 1, the two major parts of the pipe joint are cylindrical member 10 and apertured member 12. The third and last element in the arrangement is sealing and locking washer 14, which is shown independently in Figs. 3 and 4.

Cylindrical member 10 comprises cylindrical portion 16, enlarged, cylindrical portion 18 and flange 20 at one of its extremities. Immediately adjacent to the flange 20, annular groove 22 is formed in the enlarged portion 18.

Apertured member 12 is an annular, collar-like member including a central opening 24 which extends axially to a point where it merges with shoulder 26. That shoulder extends radially outwardly into annular groove 28, which is adjacent to counterbore 30, which in turn communicates with enlarged counterbores 32 and 34. The outer diameter of the apertured member 12 is illustrated as being threaded; this is useful when the pipe joint is used in certain environments where threading is necessary to facilitate assembly, but it is not an essential element of the invention.

The third element of the sealed and locked pipe joint, which has been designated as sealing and locking washer 14, is shown in Figs. 1, 3 and 4 in its condition prior to being fully seated in the assembled pipe joint. As can be clearly seen in Figs. 3 and 4, the sealing and locking washer 14, has the shape of a hollow, truncated cone prior to being assembled. Washer 14 is made of a material which is relatively more malleable than the material of which the two major parts of the pipe joint are made. In Fig. 1 the washer 14 is shown positioned with relation to the cylindrical member 10 and the apertured member 12 prior to being fully seated, and it will be observed that the outer rim of the washer 14 is adjacent to the groove 28 of the apertured member, and the inner rim of said washer is positioned adjacent to the groove 22 of the cylindrical member. It can also be observed from Fig. 1 that the enlarged portion 18 of the cylindrical member 10 is received in the opening 24 of apertured member 12. The fit between these parts may be either a pressfit or a slip fit. While a pressfit may be employed, it should be clearly understood that it is not necessary, because the washer 14 adequately locks the cylindrical member 10 and apertured member 12 in assembled position.

The parts are fully assembled by forcing the cylindrical member 10 into the apertured member 12 (with reference to Fig. 1, by moving the cylindrical member toward the left of the figure relative to the apertured member). When a sufficient amount of force has been exerted the parts assume the position shown in Fig. 2. In this figure it will be seen that the washer 14 has assumed the shape of a conventional flat washer, and that it is confined in an annular compartment which is defined by the shoulder 26 and groove 28 of the apertured member 12, and the flange 20 and groove 22 of the cylindrical member 10. Due to the malleable property of the washer 14, it is deformed from its original frusto-conical shape to the flat, annular shape without rupturing or cracking.

The washer 14 should be of a metal which is malleable and considerably softer than members 10 and 12. I prefer that parts 10 and 12 be of hardened steel and washer 14 of mild steel having a "Rockwell B" hardness of 55 to 65 after forming and before seating. In order to minimise stress concentration, it is desirable that the edges be rounded. For example, when the washer has a thickness of about .06 in. the edges may have a radius of about .015 in.

In addition to having its shape changed in the seating step, the washer 14 also undergoes some changes in cross-sectional dimensions. These changes are caused by the fact that the cross-sectional shape taken on a radial line through one part of the annular chamber formed by the pipe parts is shorter and wider than the cross-sectional shape through a part of the washer prior to assembly. To illustrate this specifically, the radial distance from groove 22 to groove 28 in Fig. 2 is less than the slant height of the washer 14 prior to being assembled, and the distance from shoulder 26 to flange 20 is greater than the thickness of the washer 14 prior to being assembled. These dimensions are so chosen that the volume of metal in the washer is the same as the volume of the cavity formed between grooves 22 and 28. From the foregoing, it will be apparent that when the washer 14 is fully seated it will be distorted into a flat washer and also it will be deformed in such a manner to conform with the dimensions of the chamber in which it is seated. This results in the washer 14 exerting radially inwardly and outwardly directed forces on the grooves 22 and 28 respectively. This effectively seals the joint and locks the cylindrical member 10 to the apertured member 12.

It is important to note that the metal undergoes plastic deformation or cold working in the process of assembly. It therefore will not tend to return to its original shape and serves to permanently lock the parts together. By utilizing a washer metal such as mild steel which, particularly after the cold working, has high strength in shear, I obtain a rugged joint which can withstand very rough handling and still retain its sealing properties.

From the foregoing description, it will be observed that I have provided a sealed and locked pipe joint which meets each of the objects of this invention. The many practical applications of this type of sealed and locked pipe joint will be apparent to those skilled in this art.

I claim:

1. A sealed joint comprising a first metallic member and a second metallic member, said first member comprising a portion having a cylindrical outer surface, a flange extending radially outwardly from said first member adjacent said portion, a first annular groove between and bounded by said portion and said flange; said second member comprising a bore embracing said cylindrical outer surface, the diameter of said cylindrical surface and said bore being substantially the same, a shoulder extending radially outwardly at one end of said bore, a second annular groove adjacent to and bounded on one side by said shoulder, a counterbored section forming the other side of said second annular groove, said counterbored section having an internal surface closely embracing the radially outer surface of said flange; and a washer formed of plasticly deformed metal relatively more malleable than said first and second members compressed between said shoulder and said flange and substantially filling said first and second annular grooves so as to form a tight seal.

2. A sealed joint as defined in claim 1 wherein said washer is formed of mild steel.

3. A sealed joint as defined in claim 1 wherein said first member is tubular and said flange is adjacent one end of said first member.

4. A sealed joint as defined in claim 1 wherein said shoulder and the face of said flange abutting said washer are substantially flat and parallel to each other.

5. A sealed joint as defined in claim 4 wherein the said surfaces of the shoulder and flange are normal to the axis of said cylindrical surface.

6. A sealed joint as defined in claim 1 wherein said washer is of an initially frustoconical form and is compressed into its final shape on assembly of said first and second members.

7. A sealed joint as defined in claim 5 wherein said washer is of an initially frustoconical form and is compressed into its final shape on assembly of said first and second members.

8. A method of forming a locked and sealed joint between a first metallic member and a second metallic member, said first member comprising a portion having a cylindrical outer surface, an annular flange extending radially outwardly from said first member adjacent said portion and a first annular groove between and bounded by said portion and said flange; said second member comprising a cylindrical bore of substantially the same diameter as said cylindrical outer portion, a shoulder extending radially outwardly from said bore, a second annular groove adjacent to and bounded by said shoulder, and a counterbored section forming the other side of said second annular groove and having a internal diameter substantially the same as the external diameter of said annular flange; said method comprising providing a malleable metallic frustoconical washer, softer than said first and second metallic members, said washer having an inner diameter substantially the same as that of said cylindrical section, an outer diameter substantially the same as the inner diameter of said counterbored section, and a slant height greater than the diameter of a cavity formed by said first and second grooves, said annular flange and said shoulder, and the volume of metal in said washer being substantially the same as the volume of said cavity, assembling said first and second members and said washer with said cylindrical section entering said bore and said washer surrounding said first member and positioned between said shoulder and said flange, and pressing said first and second members together axially, thereby compressing said washer between said flange and said shoulder, subjecting it to plastic deformation, and filling said cavity to provide a seal and lock said first and second members together.

9. A method as defined in claim 8 wherein said washer is formed of mild steel having a "Rockwell B" hardness of about 55 to 65.

References Cited in the file of this patent

UNITED STATES PATENTS

| 1,201,400 | Watrous | Oct. 17, 1916 |
| 2,078,212 | Leighton | Apr. 20, 1937 |
| 2,390,103 | Johnson | Dec. 4, 1945 |